US007044496B2

(12) United States Patent
Holmes

(10) Patent No.: US 7,044,496 B2
(45) Date of Patent: May 16, 2006

(54) STRETCHER CARRIER

(76) Inventor: David A. Holmes, 1258 W. Ocean View Ave., Norfolk, VA (US) 23503

( * ) Notice: Subject to any disclaimer, the term of this patent is extended or adjusted under 35 U.S.C. 154(b) by 50 days.

(21) Appl. No.: 10/645,666

(22) Filed: Aug. 22, 2003

(65) Prior Publication Data

US 2004/0108688 A1 Jun. 10, 2004

Related U.S. Application Data

(60) Provisional application No. 60/405,324, filed on Aug. 23, 2002.

(51) Int. Cl.
*B62B 1/00* (2006.01)

(52) U.S. Cl. ...................... 280/639; 280/640; 280/652; 280/47.131; 5/627

(58) Field of Classification Search ............... 280/638, 280/35, 40, 639, 640, 652, 63, 30, 47.131, 280/47.15; 5/89.1, 626, 627; 296/20
See application file for complete search history.

(56) References Cited

U.S. PATENT DOCUMENTS

| | | | | |
|---|---|---|---|---|
| 1,159,746 | A | 11/1915 | Clark | |
| 2,394,245 | A | 2/1946 | Koller | |
| 3,222,100 | A | 12/1965 | Lindzy | |
| 3,223,429 | A | 12/1965 | Hastings | |
| 4,037,871 | A * | 7/1977 | Bourgraf et al. | 296/20 |
| 4,192,541 | A * | 3/1980 | Ferneau | 296/20 |
| 4,538,657 | A | 9/1985 | Tuggle | |
| D295,101 | S | 4/1988 | Tuggle | |
| 4,822,065 | A | 4/1989 | Enders | |
| 5,572,756 | A * | 11/1996 | Muuranen et al. | 5/626 |
| 6,039,333 | A | 3/2000 | Hamblin | |
| 6,142,491 | A | 11/2000 | Darling, III | |
| 6,164,671 | A | 12/2000 | Darling, III | |
| 6,270,092 | B1 | 8/2001 | Darling, III | |
| 6,279,631 | B1 | 8/2001 | Tuggle | |
| 6,283,496 | B1 | 9/2001 | Dickmann | |
| 6,375,200 | B1 * | 4/2002 | Harter | 280/30 |
| 6,568,009 | B1 * | 5/2003 | Linger et al. | 5/627 |
| 6,606,829 | B1 * | 8/2003 | Benincasa et al. | 52/155 |
| 6,681,424 | B1 * | 1/2004 | Bourgraf et al. | 5/611 |
| 6,725,872 | B1 * | 4/2004 | Kindell et al. | 135/118 |
| 2001/0002745 | A1 | 6/2001 | Weber | |

* cited by examiner

*Primary Examiner*—Christopher P. Ellis
*Assistant Examiner*—Brian Swenson
(74) *Attorney, Agent, or Firm*—Connolly, Bove, Lodge & Hutz LLP

(57) ABSTRACT

A stretcher carrier is provided for transporting and stabilizing sick and injured patients. The carrier can be quickly converted between a folded, storage configuration and operational configurations. The carrier includes a folding foot prop and a foot prop locking and release mechanism for changing the position of the foot prop. The carrier may also include conventional bicycle-type wheels or special all-terrain wheels.

12 Claims, 13 Drawing Sheets

STRETCHER CARRIER

CROSS REFERENCE TO RELATED APPLICATIONS

This application claims the benefit of U.S. provisional Application Ser. No. 60/405,324, filed Aug. 23, 2002 and entitled STRETCHER CARRIER.

BACKGROUND OF THE INVENTION

Stretchers, body boards and gurneys are currently used for transporting patients to an emergency vehicle. Such devices suffer from various disadvantages. For instance, when transporting a patient by a hand carried stretcher, body board, or stokes basket, a bouncy effect is generally experienced during a walking or running gait. Carrying a relatively heavy patient over long distances can cause the bearers of the stretcher, body board, or stokes basket to fatigue.

Gurney users also suffer from various disadvantages such as difficulty in maneuvering over obstructions due to the small size of gurney wheels. It is quite difficult to run with a gurney when speed is a primary concern, particularly if the terrain is soft or uneven. Additionally, the number of gurneys available in an offsite or remote area is usually limited because of the size and space they take up in rescue vehicles and also because of their expense.

Therefore, an improved device for transporting injured or sick patients across various terrains is needed.

BRIEF SUMMARY OF THE INVENTION

The stretcher carrier according to the invention overcomes the above problems. The stretcher carrier makes it possible to transport injured persons on wheeled stretchers in a relatively easy manner over almost any type of terrain not accessible by vehicles. The carrier can be folded into a very compact storage configuration and set up from the storage configuration to its operational configuration very quickly. A stretcher can be quickly attached or detached from the carrier. The carrier further includes a foot prop that makes it possible to have the patient safely and stably positioned on a level surface unsupported by a stretcher-bearer. Additionally, the carrier includes a novel foot prop locking and release mechanism that facilitates movement of the foot prop between a downward, extended position in which the carrier is supported on the support surface by the foot prop and an upward, folded position in which the foot prop is elevated to facilitate rolling the carrier across terrain.

The carrier according to the invention may be equipped with special all-terrain wheels such as those disclosed in U.S. Pat. No. 4,538,657 and U.S. Pat. No. 6,279,631, the disclosures of which are incorporated herein by reference in their entirety. Alternatively, the carrier may be equipped with conventional, bicycle-type wheels.

Other objects and advantages of the invention will become readily apparent from the following detailed description and drawings, wherein preferred embodiments of the invention are shown and described.

DETAILED DESCRIPTION OF THE INVENTION

Figure 1:
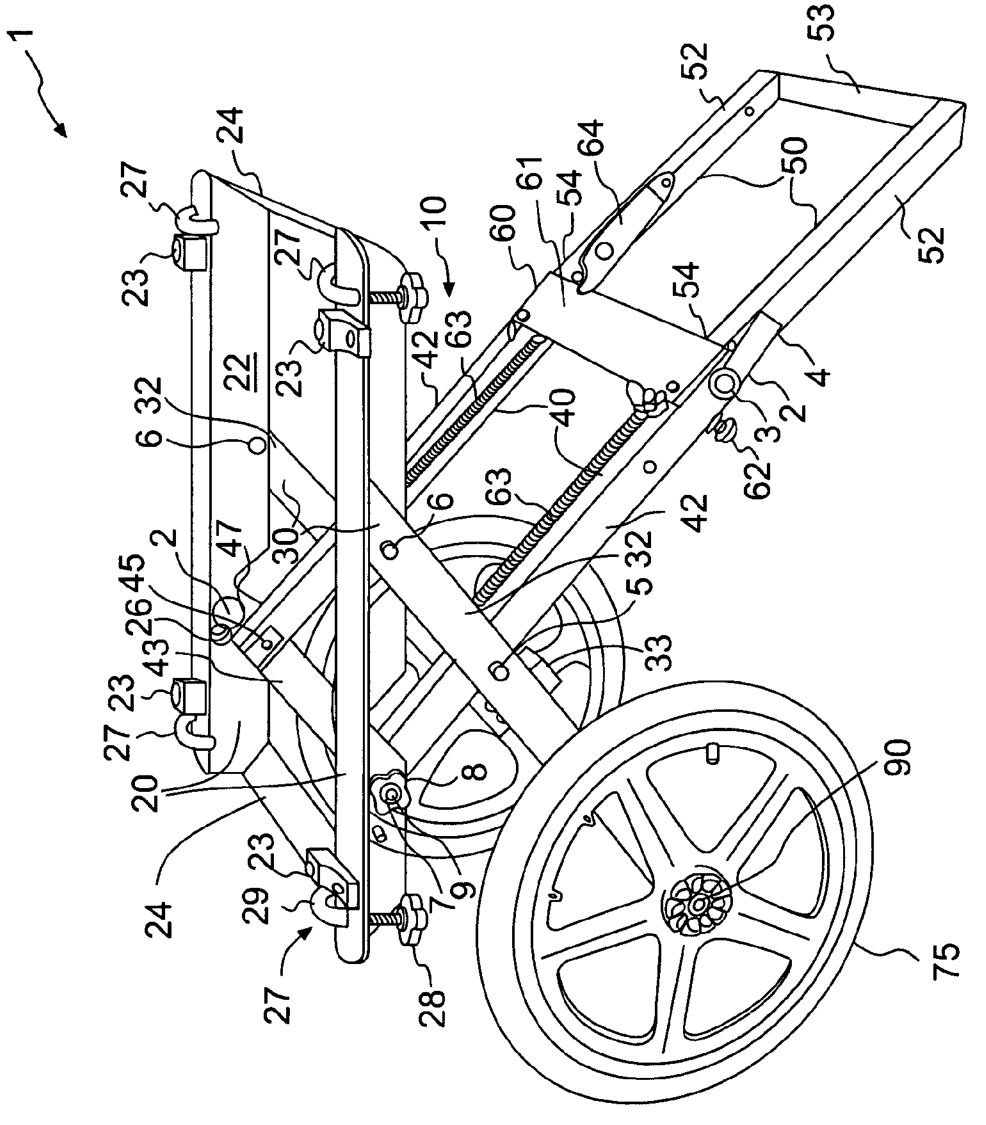
FIG. 1 illustrates a stretcher carrier according to an embodiment the invention, wherein the stretcher carrier is set up in a first operational configuration for supporting a patient.

FIG. 1 illustrates a stretcher carrier 1 according to one embodiment of the invention. The stretcher carrier 1 includes a collapsible and expandable frame 10 and wheels 75 which can be mounted to and removed from the frame 10 without tools. The frame 10 may be constructed of very strong anodized, non-corrosive or rustproof aluminum such that the frame is capable of supporting a person weighing over 500 pounds on a stretcher. According to a preferred embodiment, the carrier 1 is also lightweight in that it weighs only about 35 pounds fully assembled.

Figure 2:
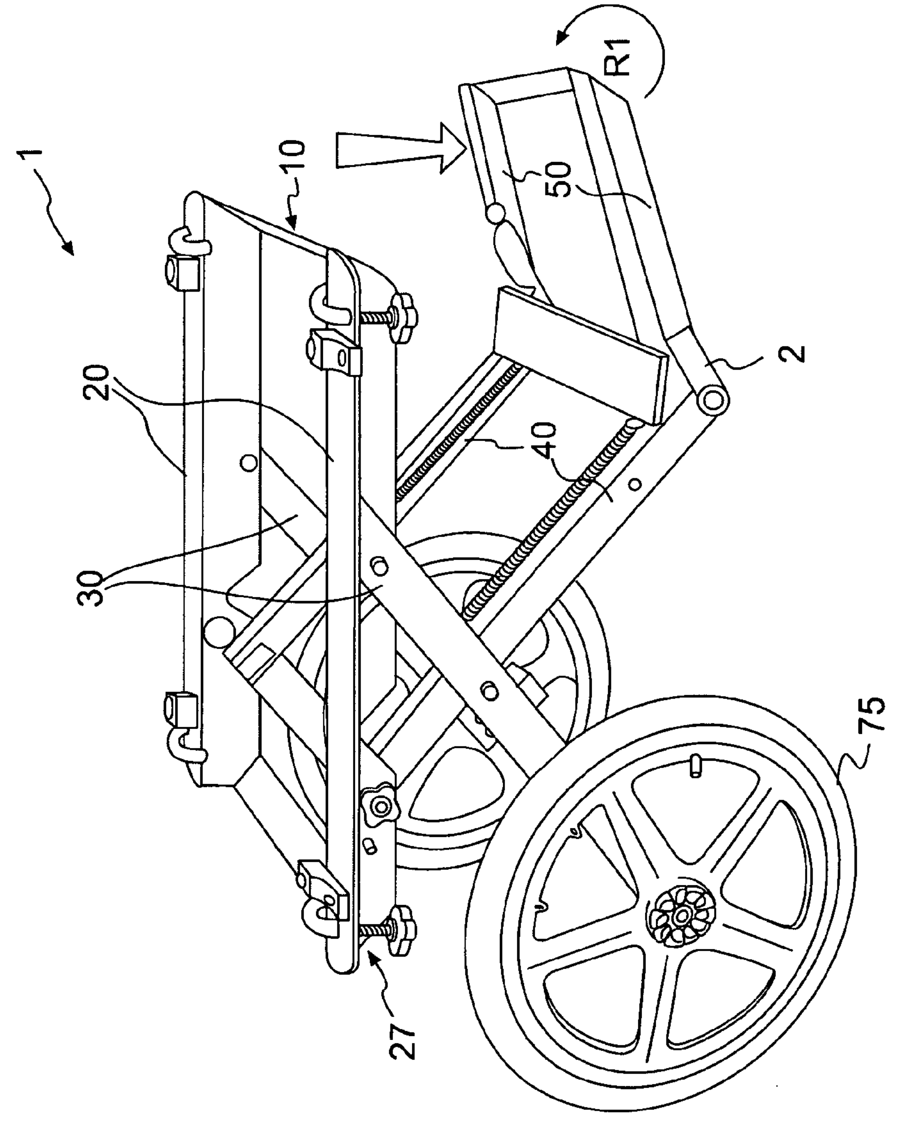
FIG. 2 illustrates the stretcher carrier in a second operational configuration for transporting a patient.
Figure 16:
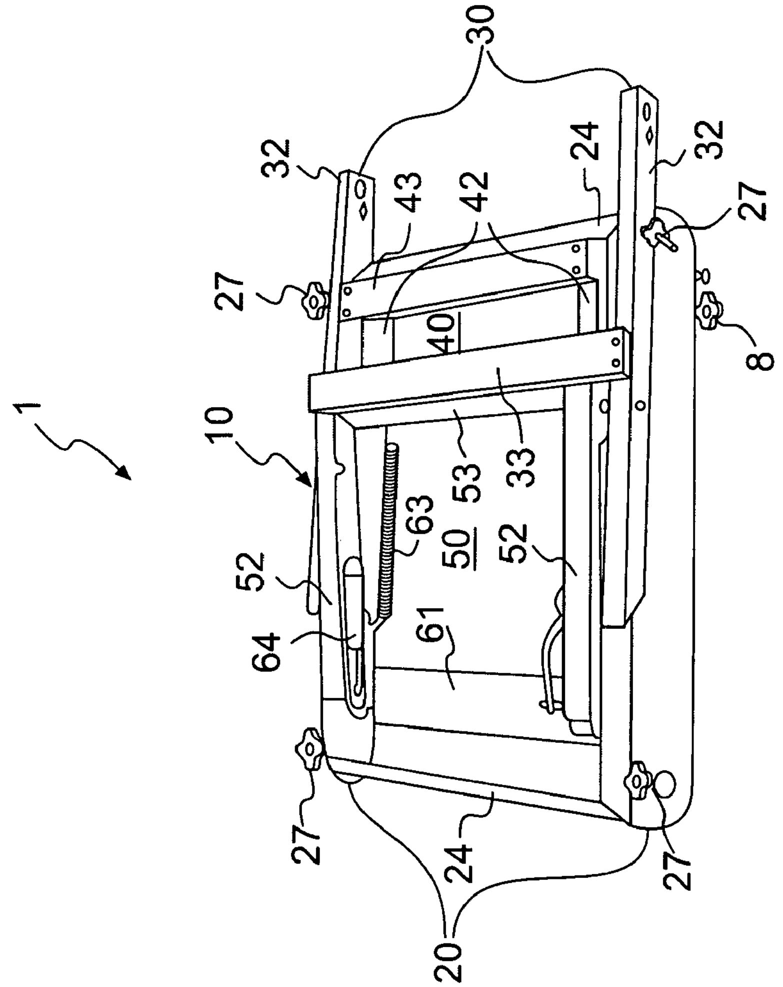
FIG. 16 shows the stretcher carrier in a collapsed position for storage, wherein the wheels and axles of the stretcher carrier have been removed.

Referring still to FIG. 1, the frame 10 includes a stretcher platform 20 for supporting a stretcher, a wheel leg support 30 for supporting the wheels 70, a foot prop support 40 and a foot prop 50 pivotally attached to the foot prop support 40 for supporting the stretcher carrier 10 on a ground surface. The frame 10 can be assembled for use as shown in FIGS. 1 and 2, and can be collapsed or folded into a storage configuration as shown in FIG. 16. The means and methods by which the frame is expanded, assembled and collapsed are discussed in following paragraphs.

As best shown in FIGS. 1 and 2, the stretcher platform 20 includes a pair of stretcher platform legs 22 spaced apart and extending parallel to each other, and a pair of stretcher platform crossbars 24 disposed at opposite ends of the stretcher platform 20 and extending between the platform legs 22. The wheel support 30 includes a pair of wheel support legs 32 spaced apart and extending parallel to each other. A wheel support crossbar 33 is attached between the wheel support legs 32 to reinforce the wheel support legs 32 and the foot prop support legs 42. The foot prop support 40 includes a pair of foot prop support legs 42 spaced apart and extending parallel to each other. A foot prop support crossbar 43 extends between the foot prop support legs 42 at a first end of the foot prop support 40 to reinforce the foot prop support legs 42. The foot prop 50 includes foot prop legs 52 and a foot prop base member 53 extending between the legs 52. The foot prop 50 is pivotally attached to a second end of the foot prop support 40 via pivot elements 2. The pivot elements 2 may include a pin or bolt 3 and a stabilizing arm 4 for stabilizing the foot prop 50.

The wheel support 30 and foot prop support 40 are pivotally connected to each other by a first set of pins or bolts 5 disposed in pin/bolt holes (not shown) located at intermediate positions along the length of the wheel support legs 32 and the foot prop support legs 42. The wheel support 30 is pivotally fastened, at a first end 34 thereof, to the stretcher platform 20 by a pair of pins or bolts 6. The pins/bolts 6 are received in holes (not shown) in the wheel support legs 32 and fastener holes (not shown) in the stretcher platform legs 22. The foot prop support 40 can be attached, at the first end thereof, to the stretcher platform 20 by fasteners 7, which are preferably lock knob fasteners. The fasteners 7 are received in fastener holes 26 in the stretcher platform legs 22 and fastener holes 45 in the platform legs 22. Thus, when the frame 10 is assembled as shown in FIG. 1, the first end of the wheel support 30 and the first end of the foot prop support 40 are longitudinally spaced from each other on the stretcher platform 20. According to the arrangement described above, each wheel support leg 32 is pivotally attached to a respective platform leg 22, and is also pivotally attached to a respective wheel support leg 32. Each foot prop support leg 42 can be fixed to a respective platform leg 22 to lock the fame 10 in an operational configuration, or detached from the respective platform leg 22 to allow the frame to be folded or collapsed into a storage configuration.

FIG. 1 shows the stretcher carrier 1 assembled for use in a first operational configuration in which it is prepared to receive a stretcher. In this position, the stretcher platform 20 is substantially parallel to the ground surface, and the wheel leg 30, foot prop support 40 and foot prop 50 are locked in fully extended positions such that the wheel leg 30 and foot prop support 40 form an X-shaped structure when viewed from a side view. The wheels 75 are rotatably mounted to a second end of the wheel leg 30 and rest on the ground surface. The foot prop 50 rests on the ground surface, with the base member 53 engaging the ground surface, and serves in conjunction with the wheels 75 to stabilize and support the carrier 1 in a stationary position. Thus, in the position shown in FIG. 1, the wheel leg 30, foot prop support 40, foot prop 50 and wheels 75 support the platform 20 in a substantially horizontal position with respect to the ground surface.

Figure 10:
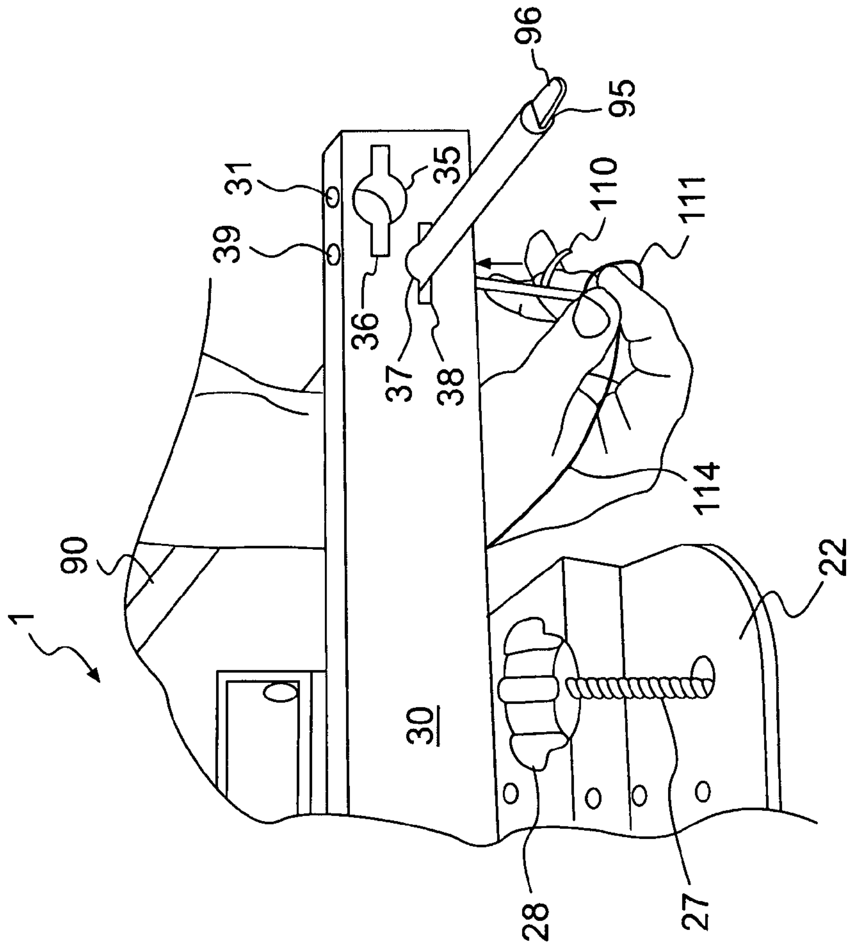

FIG. 2 shows the carrier 1 assembled in a second operational configuration for transporting a patient once a stretcher is loaded onto the carrier, or for otherwise rolling the carrier across along the ground or other surfaces. As shown in FIG. 10, in this position, the stretcher is configured in a similar manner to the first operational configuration described in the preceding paragraph, except that the foot prop 50 is rotated in a first rotational direction R1 such that it is partially folded in an upward position so as to clear the ground surface. Thus, in this position, the carrier 1 can be rolled across various terrains without the foot prop 50 contacting the ground surface.

Figure 3:
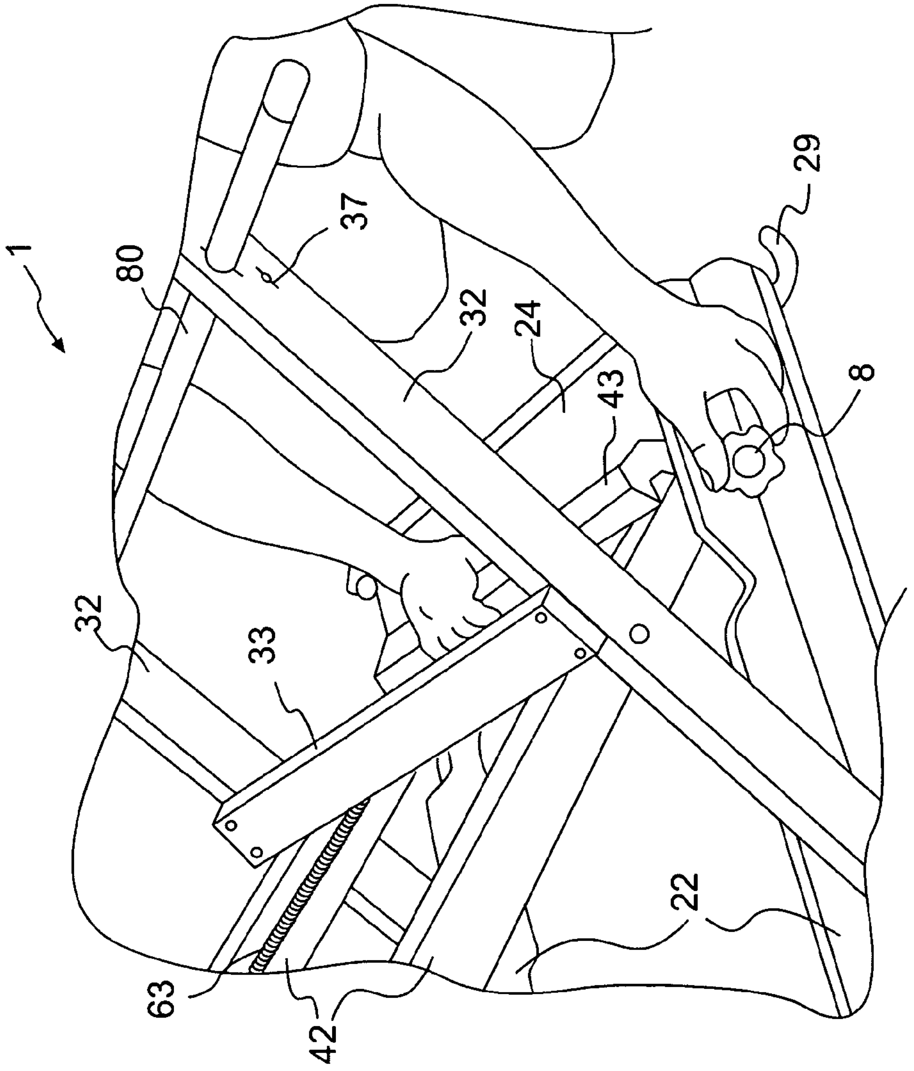
FIG. 3 is a cut-away view showing assembly of the stretcher carrier.

According to a preferred embodiment of the invention, the frame may be locked into its assembled form by tightening the two fastening elements 7. Each fastening element 7 may include threaded knob 8 and mating threaded bolt 9. Locking of the assembled frame 10 can be achieved by inserting the threaded bolts 9 into the fastening holes 26 and 45, and turning the knobs 8 such that the knobs 8 turn down on the threaded bolt 9 to the point that the wheel support 30 is tightly fixed to the stretcher platform 20. Locking the frame 10 prevents the wheel support 30 and foot prop support 40 from collapsing/folding under a load. The threaded bolts 9 may have special threads such that only one to two 360 degree twist of the knob 8, as shown in FIG. 3, is required to lock the frame 10 into its operational configuration. In particular, the threads of the bolt 9 may have a thread ratio of 4 quads pitch. The threads are typically spaced about 1.75 mm apart on a 10 mm unthreaded diameter. For example, one 360 degree revolution of the knob 8 moves the lock knob in or out about ¼ of an inch. Also, as shown in FIG. 1, depressions (not shown) in the platform legs 22 and projections 47 of the foot prop support legs 42 can be provided to help align the frame 10 for ease of inserting the bolts 9 into the fastener holes 26, 45.

Figure 4:
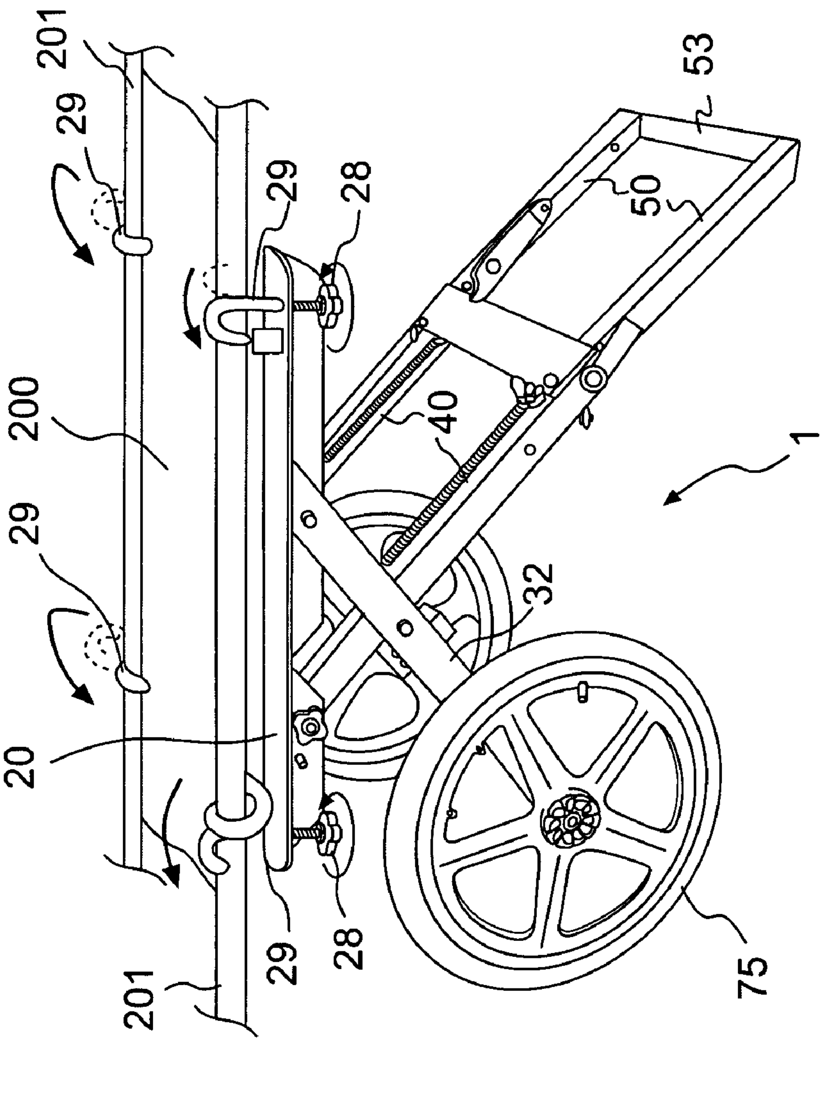
FIGS. 4 and 5 show the stretcher carrier supporting a stretcher.
Figure 5:
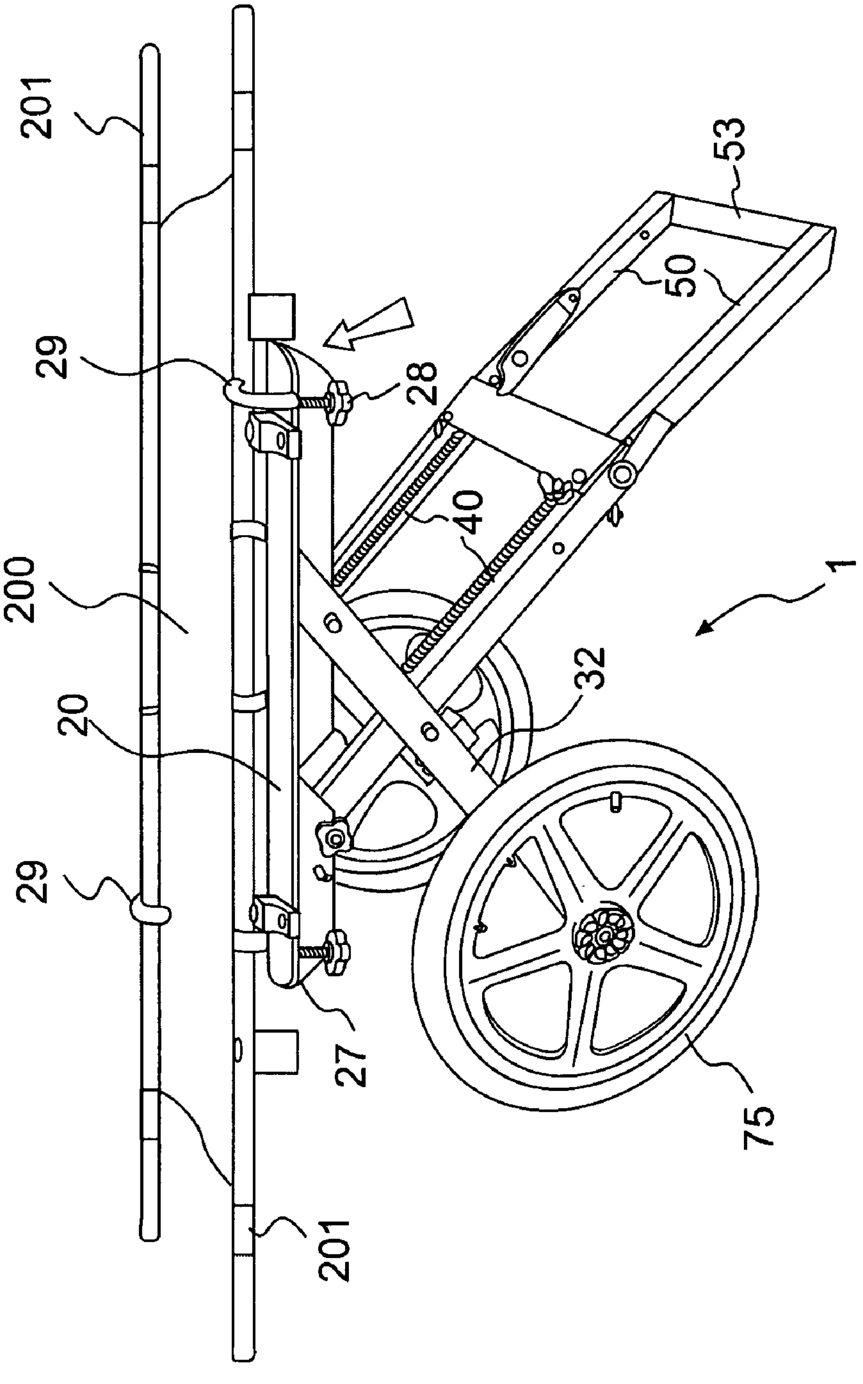

The stretcher platform 20 includes stretcher clamps 27 and optional stretcher pads 23 for securing a stretcher 200 to the carrier 1 as illustrated in FIGS. 1, 4 and 5. The clamps 27 and pads 23 are arranged such that the stretcher arms 201 rest on the pads 23 and the clamps 27 firmly grasp the stretcher arms 201. The clamps 27 may comprise members including a threaded knob 28, and a threaded, hooked arm 29. The threads of the arm 29 may have the same specifications as the threads of the threaded bolts 9 of the fasteners 7. A stretcher 200 can be secured onto the carrier 1 by simply aligning the stretcher arms 201 onto the pads 28, placing the arms 29 over the rods 201 and turning the knobs 28 onto the arms 29 until the arms 29 secure the stretcher 200 on the platform 20.

Figure 6:
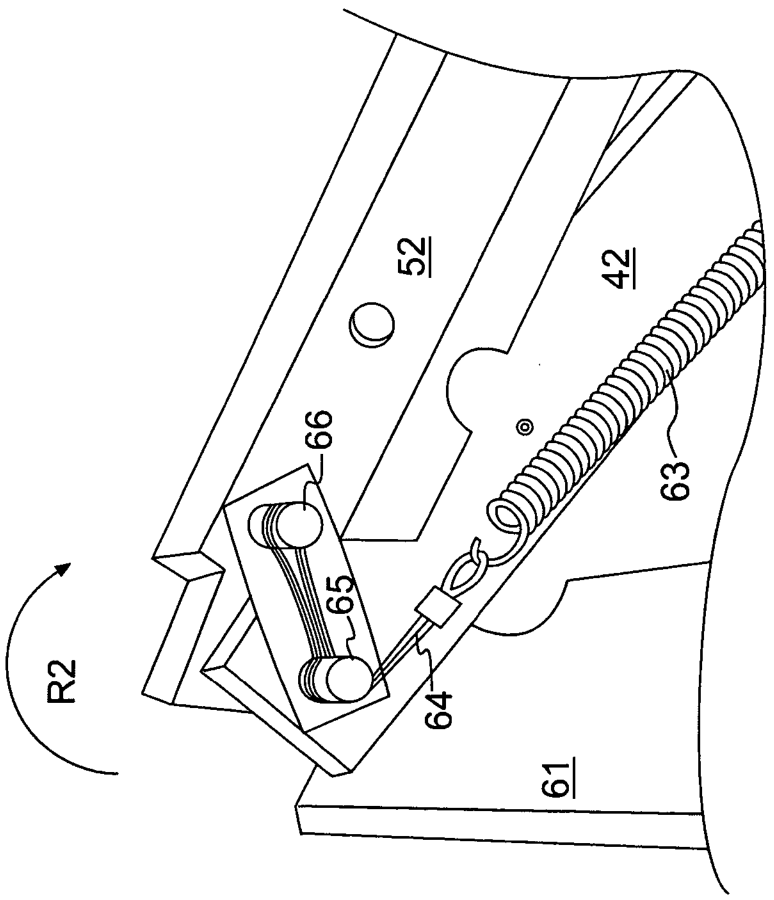
FIG. 6 illustrates a safety braking mechanism for a foot prop of the stretcher carrier according to the invention.
Figure 7:
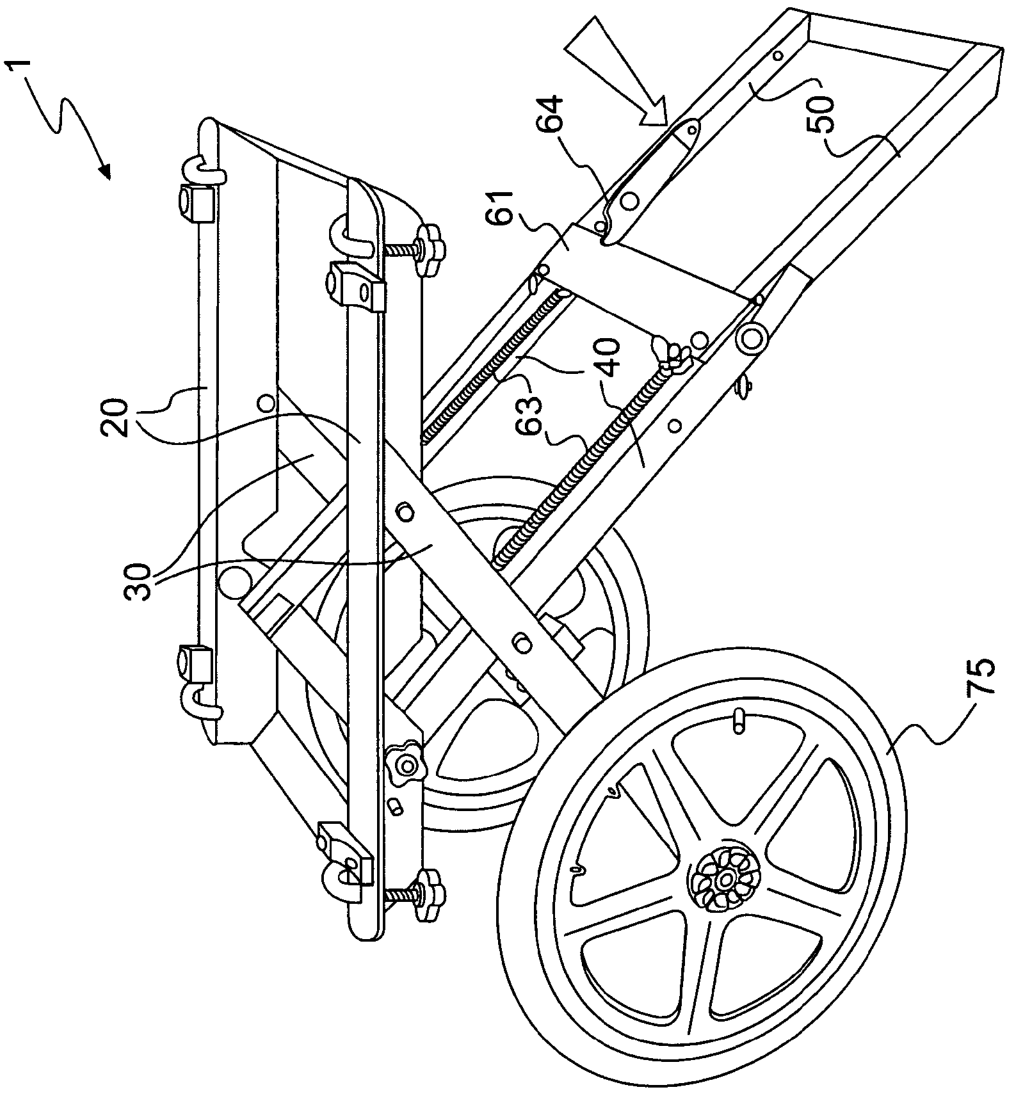
FIG. 7 illustrates activating a release mechanism for the foot prop of the stretcher carrier.
Figure 8:
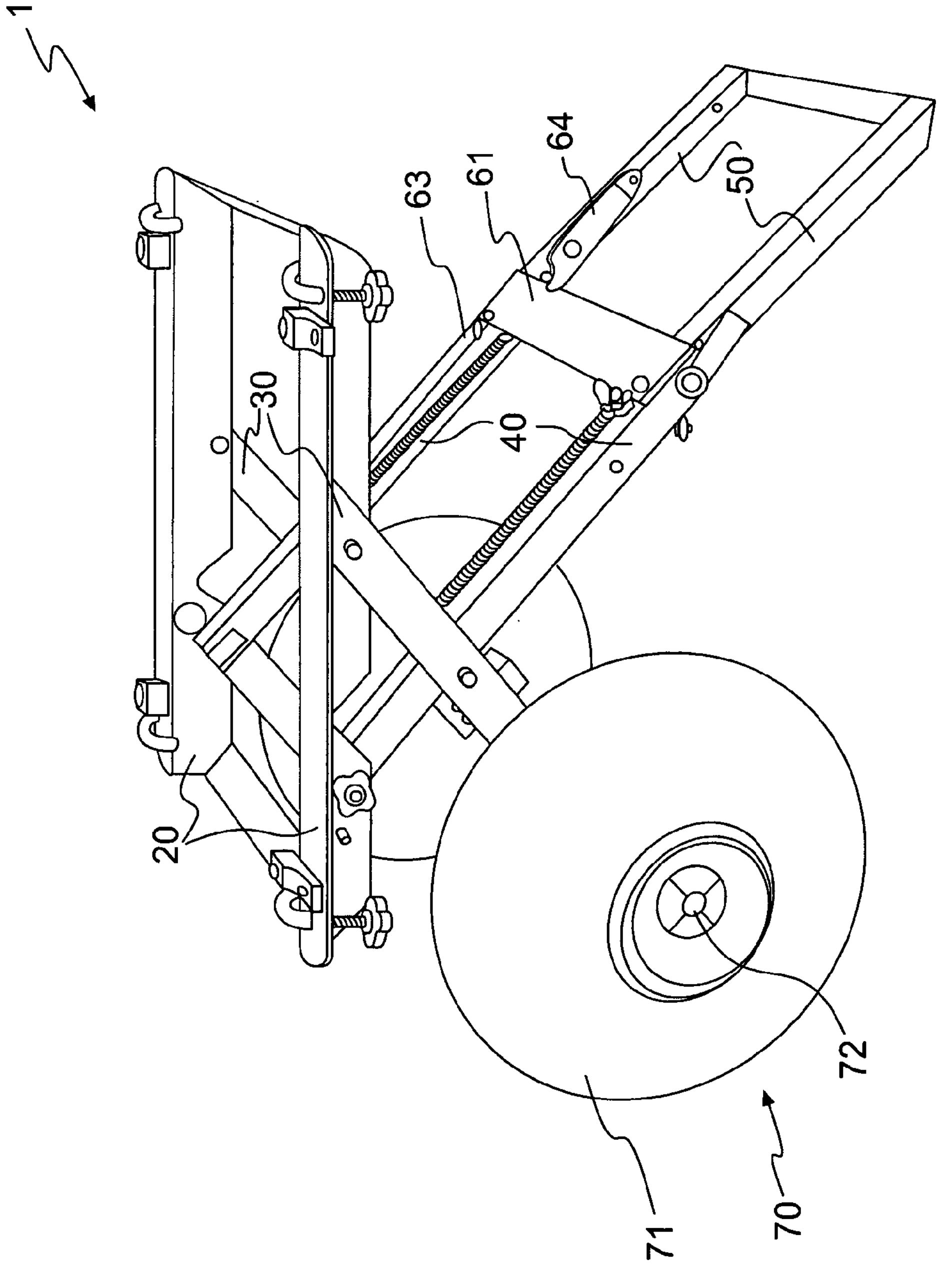
FIG. 8 shows the stretcher carrier equipped with all-terrain wheels.

The carrier 1 employs a novel foot prop locking and release mechanism 60, as best shown in FIGS. 1, 7 and 8. The release mechanism 60 allows the foot prop 50 to be moved from its extended, downward position (illustrated in FIGS. 1 and 7, for example) to its folded, upward position (illustrated in FIG. 2). The release mechanism 60 includes a locking plate 61 retained near the second end of the foot prop support 40 by locking plate retaining elements or cords 62, two main springs 63 each secured to locations on the foot prop support legs 42 and locations on the foot prop legs 52, and a foot prop release pedal 64 pivotally attached to one of the foot prop legs 52 and arranged to pivot so as to engage and disengage the locking plate 61. Each spring 63 is attached to a foot prop leg 52 by a safety braking mechanism including a steel cord 64, a cord retaining pin 65 located on the foot prop support leg 42 and a connecting pin 66 located on the foot prop leg 52. One end of the steel cord 64 is connected to an end of the spring 63. The cord 64 extends over the retaining pin 65. A second end of the cord 64 is connected to the connecting pin 66. When the foot prop 50 is folded in the rotational direction R2 into a collapsed storage position as shown in FIG. 6, the safety braking mechanism relieves tension in the spring 63 and prevents the foot prop 50 from snapping back suddenly towards its extended position. Without the safety braking mechanisms, the springs 63 would be under high tension when the foot prop is folded in its storage position, and the foot prop 50 could possibly snap back rapidly and injure the hand or leg of the operator.

Referring to FIG. 1, when the foot prop 50 is locked in its downward position (substantially parallel to the foot prop support 40), the locking plate 61 engages retaining edges 54 of the foot prop legs 52 and obstructs rotation of the foot prop 50 in a first rotational direction R1. By obstructing a portion of the foot prop 50, the locking plate 61 prevents rotation of the foot prop 50 to its upward position and therefore locks the foot prop 50 in its extended position.

In order to move the foot prop 50 from its extended position to its upward, partially folded position, as illustrated in FIG. 2, the stretcher operator needs only to press down on the release pedal 64 as indicated by the arrow in FIG. 7, so as to rotate the release pedal 64 into engagement with the locking plate 61. The release pedal 64 is easily operated by the operator's foot. When the release pedal 64 engages the locking plate 61, the locking plate 61 disengages the retaining edge 54 of the foot prop 50. The foot prop 50 then rotates into its upward, folded position under the tension force of springs 63.

To return the foot prop 50 to its downward, extended position, the carrier operator/bearer simply needs to somewhat quickly push the foot prop 50 (using the operator's foot) so that so that foot prop 50 rotates in a second rotational direction R2 opposite the first rotational direction R1 until the foot prop 50 is positioned slightly past its extended, locked position, and thereafter release the foot prop 50. As the foot prop 50 is rotated in the second direction past its extended, locked position, the locking plate 61 falls into position for engaging the retaining edge 54 of the foot prop 50. Once the foot prop 50 has been rotated past its extended, locked position and released by the operator, the foot prop 50 will return to the extended, locked position under the tension force of the springs 63.

The carrier 1 can be used in urban environments or other environments including generally hard surfaces when equipped with wheels 75, which may be conventional bicycle-type wheels (shown in FIG. 1, for example).

As shown in FIG. 8, carrier 1 may alternatively be equipped with all-terrain wheels 70 for use in beach, wilderness or other off-road environments. The all-terrain wheels 70 have pneumatic, flexible, plastic tires 71 that were developed specifically for sand, mud, loose gravel and other soft or uneven terrain. All-terrain wheels 70 can also be used on hard surfaces. Such all-terrain wheels are disclosed in U.S. Pat. No. 4,538,657 to Tuggle and U.S. Pat. No. 6,279,631 to Tuggle, the disclosures of which are incorporated by reference in their entirety. As disclosed in U.S. Pat. No. 4,538,657, wheel 70 may include a low pressure tire 71 comprising a thin-walled torus of elastomeric material, the torus having an inner diameter surface for engaging a tire supporting rim 72, means (such as a valve or sealable opening 74) for inflating the torus to a low pressure configuration and an outer diameter surface for contacting said soft or irregular support surfaces, wherein the torus deforms or flattens substantially when said tire 71 contacts said surfaces with an axle load applied to said wheel 70. Alternatively, as disclosed in U.S. Pat. No. 6,279,631, the torus may be made of a flexible substantially inelastic material that will flatten under a load to facilitate movement of the tire over soft or regular support services and will not deform up to a temperature of about 225° F.

Figure 9:
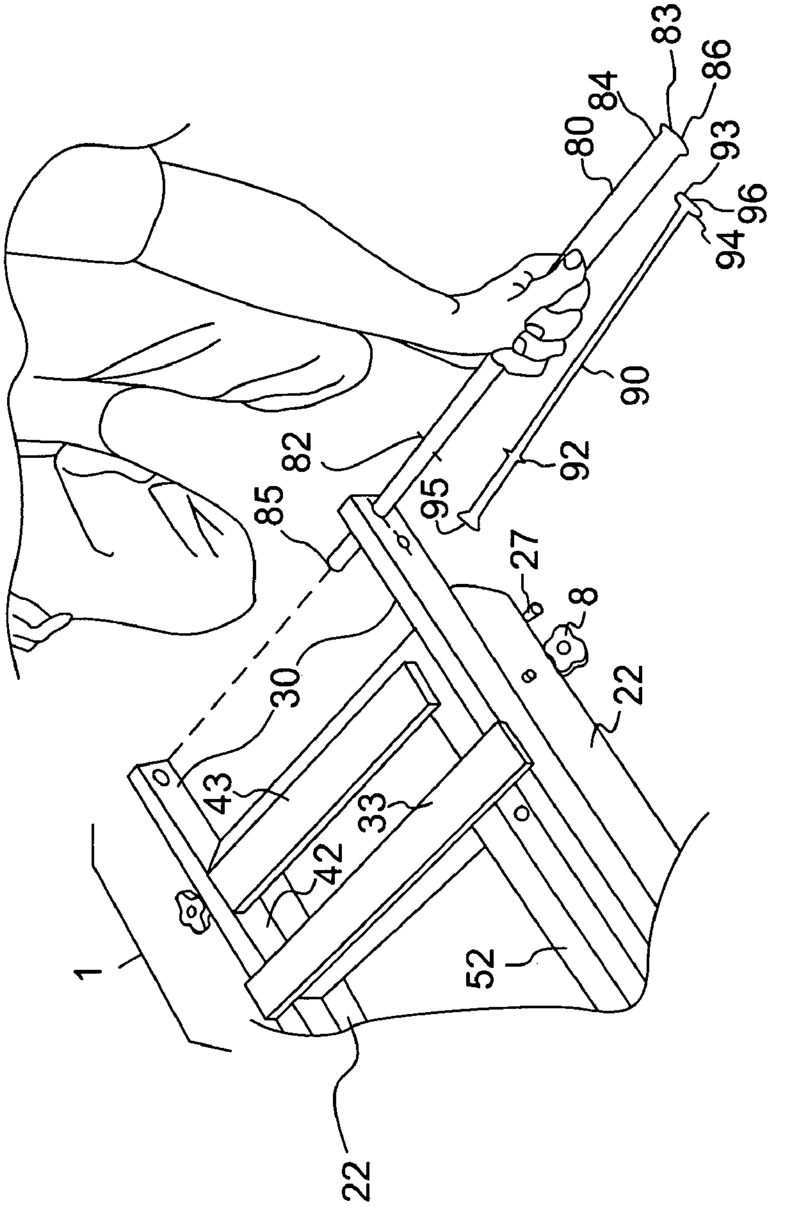
FIGS. 9 and 10 illustrate removal and installation of axles of the stretcher carrier.

Because of the different functional demands of wheels 70 and wheels 75, specific axles 80 and 90, shown in FIG. 9, are provided for the wheels 70 and 75, respectively. The axle 80, which is used with wheels 70, is larger in diameter than axle 90. According to one embodiment of the invention, axle 80 may have a diameter of 1" and axle 90 may have a diameter of ½". However, other diameters could be used for each axle. In order to allow the frame to accommodate either of axles 80 and 90 without modification, each wheel support leg 32 preferably has a first axle hole 35 sized to receive the axle 80 and a second axle hole 37 sized to receive the axle 90. Thus, axles 80 and 90 can easily be exchanged for one another on carrier 1.

Figure 11:
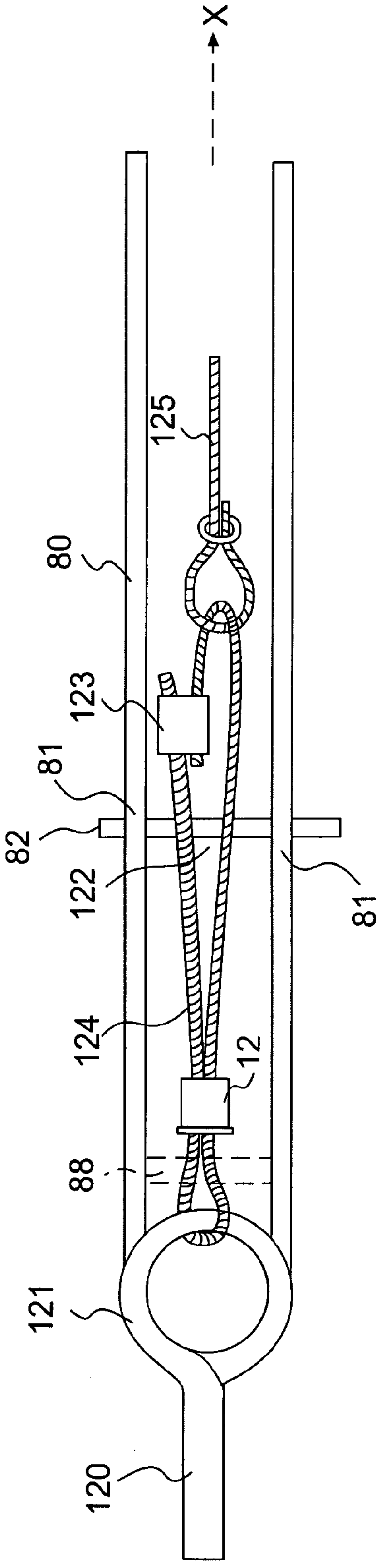
FIGS. 11–13 illustrate an axle for use with all-terrain wheels for the stretcher carrier.

According to preferred embodiments of the invention, the axles 80 and 90 include unique features. As shown in FIG. 11, the axle 80 includes a roll pin 82 that is received through holes 81 in opposite sides of the axle 80 near a first end 85 of the axle 80. The roll pin 82 extends through the axle in a direction orthogonal to the longitudinal axis X of the axle 80 and preferably protrudes about 5/32" from diametrically opposite sides of the axle 80. Referring again to FIG. 9, an annular stop 83 is provided at the second end 86 of the axle 80. Each axle hole 35 has roll pin slots 36 (shown in FIG. 10) which allow the roll pin 82 to pass through the axle hole 35 when the roll pin 82 is aligned with the roll pin slots 36, and which prevent the roll pin 82 from passing through the axle hole 35 when the roll pin 80 is out of alignment with the roll pin slots 36. The annular stop 83 has a greater diameter than the axle hole 35 and therefore cannot pass through the axle hole 35. The annular stop 83 includes a marking or raised element 84 (illustrated in FIG. 9) that is aligned with the roll pin 82 to indicate the position of the roll pin 82. Alternatively, another roll pin 82 may be substituted for annular stop 83. The axle 80 can be installed by aligning the roll pin 82 with the roll pin slots 36, inserting the first end 85 of the axle 80 through the axle holes 35 until the roll pin 82 and annular stop 83 are located just outside a respective wheel leg 32 and thereafter turning the axle 80 such that the roll pin 82 is out of alignment with the roll pin slots 36. The axle 80 can be removed by aligning the roll pin 82 with the wheel stop slots 36 and thereafter sliding the axle 80 out through the axle holes 35. Thus, the axle 80 can be installed and removed without removing the roll pin 82. The marking or raised element 84 makes it easy for the person installing or removing the axle to determine whether the roll pin 82 is aligned with the roll pin slots 36. When the axle 80 is installed in the wheel support legs 32, the roll pin 82 and annular stop 83 are each located between a wheel 70 and a wheel support leg 32 to prevent the wheels 70 from rubbing against the frame 10. The roll pin 82 and annular stop 83 are used instead of removable spacers, because removable spacers could be lost in the process of assembling and disassembling the carrier 1, in which case the carrier 1 would be rendered inoperable.

As depicted in FIG. 10, the carrier 1 includes a fastening pin 110 to retain the axle 80 in place and prevent the axle 80 from rotating and sliding from side to side. The fastening pin 110 is inserted through fastening pin holes 31 in a wheel support leg 32 and fastening pin holes (not shown) in the axle 80. The fastening pin 110 includes a finger ring 111 on one end for pulling by a person's finger to facilitate insertion and removal of the fastening pin 110. The fastening pin 110 is attached to the wheel support leg 32 by a lanyard 114, so that the fastening pin 110 may be held securely in place in the pin holes 31 when disassembling or collapsing the carrier 1 for storage.

Figure 13:
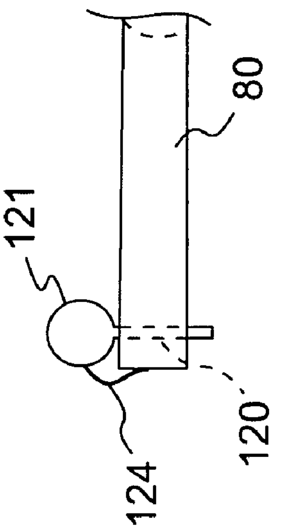
Figure 12:
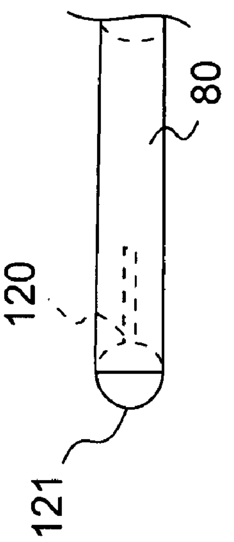

Referring to FIGS. 11–13, the axle 80 includes two retaining pins 120, each pin 120 being insertable in retaining pin holes 88 at the ends of the axle 80 for holding the wheel 70 on the axle 80. Each retaining pin 120 includes a finger ring 121 on one end for pulling by a person's finger to facilitate insertion and removal of the fastening pin 120. Each retaining pin 120 is held in place by the tension of a bungee cord lanyard 124 which is attached to a bungee cord 125 retained inside the axle 80, as shown in FIGS. 7, **13*a* and 13*b*. The tension in the bungee cord 125 is just high enough to hold the retaining pins 120 inside the axle 80 with the finger ring 121 outside and firmly against the ends of the axle 80 when the retaining pins 120 are not in use (i.e., when removing axle 80 from the carrier 1). The outside diameter of finger ring 121 is greater than the inside diameter of axle 80 but is slightly less than or equal to the outside diameter of axle 80, so a portion of finger ring 121 will fit into axle 80 and will slide through the axle hole 35 illustrated in FIG. 10**.

The lanyards 124 are preferably made of a double looped cable looped around the finger ring 121 and attached to the bungee cord 125 with swedges 123. The roll pins 82 are inserted in the axle 80 after the bungee cord 125 has been attached to the lanyards 124. The roll pin 82 passes through the loop opening 122 in one of the lanyards 121. The roll pins 82 thereby prevent the retaining pins 120 from being pulled too far to ensure that the bungee cord 125 is never exposed from the axle 80. This construction prevents people from pulling the pin out too far out of curiosity, or by accident, and possibly breaking the bungee cord. Preferably, the lanyards 124 have a 900-pound test pull rating to prevent breakage. However, if for some reason the bungee cord 125 needs to be replaced, it can be removed by simply removing the roll pin 82 from the axle 80 and pulling the lanyard 124 out further from the axle 80 to expose the bungee cord 125.

As shown in FIG. 9, the axle 90 for use with conventional wheels 75 includes a roll pin 92 that is received through holes (not shown) in the axle 90 near the first end 95 of the axle 90, and an annular stop 93 that is located near the second end 96 of the axle 90. The annular stop 93 has an outer diameter that is greater than the diameter of the axle hole 37, and also includes a marking or raised element 94 for indicating the position of the roll pin 92. Preferably, the roll pin 92 protrudes about ⅛" from diametrically opposite sides of the axle 90. Alternatively, another roll pin 92 may be substituted for annular stop 93. Roll pin 92 and annular stop 93 are similar to roll pin 82 and annular stop 83, except that roll pin 92 and annular stop 93 are sized to fit the axle 90. Axle holes 37 include roll pin slots 38, which are similar to roll pin slots 36, except that roll pin slots 38 are sized to accommodate wheel stops 92. Thus, the axle 90 can be installed and removed from the wheel support 30 in the same fashion as the axle 80.

The axle 90 is provided with fastening pin holes (not shown) which can receive the fastening pins 110 described above. To fasten the axle 90 to the frame 10, the fastening pin 110 is inserted through retaining pin holes 39 in a wheel support leg 32 and fastening pin holes (not shown) in the axle 90.

Figure 15:
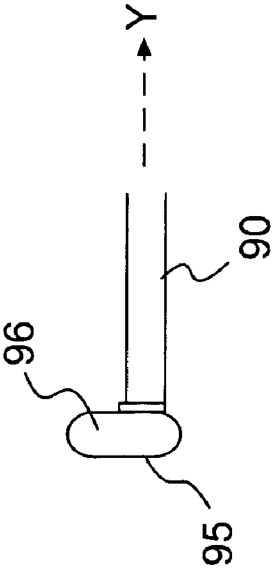
FIGS. 14 and 15 show an axle including wheel retaining element for use with conventional bicycle-type wheels.
Figure 14:
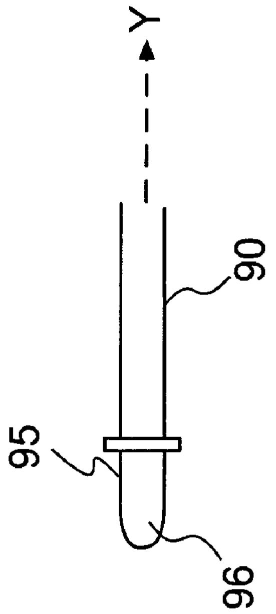

The axle 90 does not include retaining pins, bungee cords or lanyards. Instead, as shown in FIGS. 10, 14 and 15, the axle 90 includes a pair of quick-release retaining elements 95 which have arms 96 that can be folded between a first position (FIGS. 10 and 14) in which the arms 98 are substantially parallel to the longitudinal axis Y of axle 90, and a second position (FIG. 15) in which the arms 96 are substantially orthogonal to the axis Y. In the first position, arm 96 allows the wheel 75 to be removed from the axle and also allows the axle to be removed from the wheel support 30. In the second position, arm 96 retains the wheel 75 on the axle.

FIG. 16 shows the stretcher carrier 1 in its folded storage configuration without the wheels 70, 75 and axle 80, 90. In a preferred embodiment, the carrier 1 is about 31" (length)× 24" (width)×6" (height) when folded in the storage configuration without the wheels 70, 75 and axle 80, 90. Thus, the carrier 1 is very compact to facilitate storage in a rescue vehicle or helicopter. Additionally, the size and weight of the carrier 1 makes it easy to parachute or cable down the carrier 1 from a helicopter so that a patient can be transported on the carrier 1 to the landing site of the helicopter. Stretcher carrier 1 can be folded into its storage configuration by folding foot prop 50 to its fully folded, storage position, removing wheels 70 or 75 and axle 80 or 90, loosening fasteners 7 to release foot prop support 40 from the stretcher platform 20, pivoting foot prop support 40, folding foot prop 50 in a closed scissor position against foot prop support 40, and pivoting wheel support 30 in the direction opposite the direction in which foot prop support 40 is pivoted such that wheel support 30 and foot prop support 40 with foot prop 50 are substantially parallel to stretcher platform 20.

To use carrier 1, patients are placed on a stretcher on the ground, and the stretcher is thereafter placed on the platform 20. The four stretcher clamps 27 are then positioned to engage the stretcher 200, and stretcher 200 is secured on platform 20 by turning knobs 28 of clamps 27 until knobs 28 are firmly tightened down. The clamps 27 have special threads, as disclosed above, so that it takes only about 3–4 full turns to firmly engage the stretcher 200. A decal can be included on the stretcher carrier 1 to indicate where the stretcher 200 is to be placed on the stretcher platform 20 so there is minimal lifting by the stretcher-bearer, so almost all the energy is expended for pulling.

Normally the stretcher carrier 1 is pulled from one end thereof by one or two stretcher-bearers instead of there being a stretcher-bearer on each end of the stretcher 200. The carrier 1 should almost always be pulled from the end with the foot prop 50, with the patient's head also positioned at this end. It has been found that the patient's head does not bounce up and down nearly as much with the head at the same end of the carrier from which the carrier is being pulled. The head being at the end over the foot prop 50 is indicated by a decal on the stretcher carrier frame. There are exceptions where the stretcher bearer(s) and the patient's head may be at the opposite ends of the carrier 1. These exceptions are: 1) if transporting a patient parallel to an incline, it would be best if there is a stretcher bearer at each end of the stretcher carrier 1 to keep the carrier 1 from turning over; 2) if the patient on the stretcher is in shock because of blood loss or other reasons, it is best to have the head lower than the feet. In this event, the stretcher bearer(s) would position themselves at the end of the carrier 1 opposite the end where the patient's head is located, and pull or push the carrier 1. The head would automatically be lower than the feet because of the height of the stretcher 200 from the ground as related to the average height of the stretcher bearer(s). In other words, with the average height and above for most stretcher-bearers, the stretcher end being pulled or pushed is almost always higher than the opposite end. Incidentally, if the stretcher-bearers are pushing, they can better observe and monitor a patient in critical condition.

The following is a discussion of some advantages of the stretcher carrier 1 as compared to a stretcher alone or a gurney.

The advantages of the carrier over hand carried stretchers, body boards or stokes baskets are the following: 1) the stretcher carrier 1 provides an even, smooth ride for the patient without the bouncy effect from a walking or running gait—an injured or sick patient is already uncomfortable and needs to be moved as gently as possible to minimize further discomfort; 2) the stretcher carrier 1 makes it easier to carry a heavy patient long distances not accessible by vehicles without fatiguing the stretcher bearer/bearers; 3) with a preferred width of about 27 inches with wheels 70 or 75 attached, which is just slightly wider than a stretcher, the stretcher carrier 1 can pass through narrow doorways easily, whereby when carrying a stretcher alone with a heavy person that requires four or more people, the extra people could not help bearing the weight because of the narrow doorway; 4) when speed is of utmost importance in a life or death situation, one or two persons could easily run with the stretcher attached to the carrier 1 of the invention, simply because, with the patient's weight centered over the wheels, there is almost no lifting required of the persons operating the carrier 1 while pulling the carrier 1; 5) if a patient is in or almost in shock, the patient can be transported with her head lower than her feet in a Trendlenburg position, by positioning the head opposite the end of the carrier 1 with the foot prop; and 6) if a patient is experiencing a stroke or some other condition such as hemorrhaging above the waist, particularly in the head region whereby the head needs to be higher than the feet, the head may be placed at the end of carrier 1 that carrier 1 is being pulled from, thereby raising the stretcher 200 to elevate the head as much as possible.

The advantages of the carrier 1 over gurneys are the following: 1) the carrier 1 rolls easily over small obstructions that would normally stop small gurney wheels; 2) it is difficult to run with a gurney when speed is a primary concern; 3) in a mass casualty situation, mobility is more expeditious with the carrier 1 of the invention due to the more cumbersome construction of gurneys; 4) in a mass casualty situation, an unlimited number of stretchers 200 can be transported consecutively with each carrier 1—normally, patients arriving at an emergency transporting vehicle are loaded in the vehicle on a gurney, which does not leave any way to pick up other patients unless more gurneys are available, and there are likely to be less gurneys available because of the size and space gurneys take up in rescue vehicles, and also because of the expense of gurneys; and 5) moreover, one person can easily transport a patient on level ground since the patient's weight is centered over the wheels, thereby minimizing lifting effort.

In a preferred embodiment, the carrier 1 is fabricated with a relatively wide wheelbase. Because of the wide wheel base and the very substantial engaged foot prop 50, the carrier 1 with a patient is very safe and stable on a level surface unsupported by stretcher-bearers. With foot prop 50 engaged, the paramedics can administer treatment more comfortably at waist level instead of ground level. The spring loaded foot prop 50 can be easily engaged or disengaged by the rescuer's foot. The foot prop 50, when disengaged, folds out of the way for transporting the patient.

As stated above, the stretcher 200 can be quickly attached to or detached from the carrier 1 with the four easy-to-use knobs 28. No time is lost in transferring a patient to an ambulance or helicopter. Additionally, the stretcher carrier can be used to carry other things such as emergency equipment including emergency kits, gear or other items needed in an emergency situation.

The foregoing description illustrates and describes the invention. Additionally, the disclosure shows and describes only the preferred embodiments of the invention, but as mentioned above, it is to be understood that the invention is capable of use in various other combinations, modifications and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

I claim:

1. A stretcher carrier comprising:

a stretcher platform for supporting a stretcher in a substantially horizontal position;

a wheel support connected to the stretcher platform;

at least one wheel rotatably mounted to the wheel support;

a foot prop support pivotally attached to the wheel support and attached to the stretcher platform;

a foot prop pivotally attached to the foot prop support, wherein the foot prop is pivotable between a downward, extended position for supporting the stretcher carrier on a ground surface, and an upward position in which the foot prop is pivoted upward and away from the ground surface for transporting the stretcher on the stretcher carrier;

a locking plate arranged to engage retaining edges of the foot prop to maintain the foot prop in the downward, extended position; and at least one spring attached to the wheel support and the foot prop, wherein the at least one spring applies tension force to the foot prop; and a foot prop release pedal arranged to disengage the locking plate from the retaining edges upon being pushed such that the at least one spring pivots the foot prop from the downward, extended position to the upward position.

2. The stretcher carrier of claim 1, wherein the foot prop support is releasably attached to the stretcher platform by fasteners, wherein each of said fasteners includes a threaded knob and a mating threaded bolt, and wherein each of said fasteners is arranged to secure the foot prop support to the stretcher platform with one to two 360 degree twists of the threaded knob on the threaded bolt.

3. The stretcher carrier of claim 1, wherein the stretcher carrier is arranged to be converted to a collapsed storage configuration in which the wheel support and the foot prop support are substantially parallel to the stretcher platform the foot prop is folded in a closed scissor position against the foot prop support.

4. The stretcher carrier of claim 1, wherein the foot prop is pivotable to a folded, closed scissor position against the foot prop support for converting the stretcher carrier to a storage configuration, and wherein the at least one spring is attached to the foot prop by a safety braking mechanism that relieves tension in the at least one spring when the foot prop is in the folded, closed scissor position.

5. The stretcher carrier of claim 4, wherein the safety braking mechanism comprises:

a retaining pin on the foot prop support;

a connecting pin on the foot prop; and a steel cord connected to the at least one spring and the connecting pin, and extending over the retaining pin.

6. A stretcher carrier comprising:

a stretcher platform for supporting a stretcher in a substantially horizontal position;

a wheel support connected to the stretcher platform;

at least one wheel rotatably mounted to the wheel support;

a foot prop support pivotally attached to the wheel support and attached to the stretcher platform;

a foot prop pivotally attached to the foot prop support and arranged to support the stretcher carrier on a ground surface, wherein the foot prop is pivotable to a folded, closed scissor position against the foot prop support for converting the stretcher carrier to a storage configuration;

at least one spring that applies a tension force to urge the foot prop to a position for supporting the stretcher carrier on the ground surface; and a safety braking system that relieves tension in the at least one spring when the foot prop is in the folded, closed scissor position against the foot prop support.

7. The stretcher carrier of claim 6, wherein the safety braking mechanism comprises:

a retaining pin on the foot prop support;

a connecting pin on the foot prop; and a steel cord connected to the at least one spring and the connecting pin, and extending over the retaining pin.

8. A stretcher carrier comprising:

a frame arranged to support a stretcher;

an axle received in axle holes in the frame;

wheels rotatably mounted on the axle; and a pair of retaining pins disposed at opposite ends of the axle, wherein said retaining pins are arranged to retain the wheels on the axle when inserted in retaining pin holes in the axle, wherein said retaining pins are attached to lanyars that are attached to a bungee cord within the axle, wherein the retaining pins are sized to fit partially inside the ends of the axle, and wherein the retaining pins are held near the ends of the axle under tension of the bungee cord when removed from the retaining pin holes in the axle and partially inserted in the ends of the axle.

9. The stretcher carrier of claim 8, further comprising a fastening pin received in fastening pin holes in the axle and the frame, wherein said fastening pin prevents rotation and sliding of the axle when inserted in the fastening pin holes.

10. The sketcher carrier of claim 9, wherein the fastening pin is attached to the frame by a lanyard.

11. a stretcher platform for supporting a stretcher in a substantially horizontal position;

a wheel support connected to the stretcher platform;

at least one wheel rotatably mounted to the wheel support;

a foot prop support pivotally attached to the wheel support and attached to the stretcher platform;

a foot prop pivotally attached to the foot prop support for supporting the stretcher carrier on a ground surface, wherein the foot prop is pivotable between a downward, extended position for supporting the stretcher carrier on a ground surface, and an upward position in which the foot prop is pivoted upward and away from the ground surface for transporting the stretcher on the stretcher carrier;

a locking plate arranged to engage retaining edges of the foot prop to maintain the foot prop in the downward, extended position; and at least one spring attached to the wheel support and the foot prop, wherein, when the foot prop is rotated from the upward position past the extended, downward position and is thereafter released, the at least one spring applies tension force to the foot prop to urge the foot prop against the locking plate and thereby position the foot prop in the downward, extended position.

12. A stretcher carrier comprising:

a stretcher platform for supporting a stretcher in a substantially horizontal position;

a wheel support connected to the stretcher platform;

at least one wheel rotatably mounted to the wheel support;

a foot prop support pivotally attached to the wheel support and attached to the stretcher platform;

a foot prop pivotally attached to the foot prop support for supporting the stretcher carrier on a ground surface; and stretcher clamps, each of said stretcher clamps comprising a threaded knob and a threaded, hooked arm for engaging a stretcher arm, wherein each of said stretcher clamps is arranged to secure the stretcher arm by turning of the threaded knob onto the threaded, hooked arm.

* * * * *